United States Patent
Jhatakia et al.

(10) Patent No.: US 12,080,324 B2
(45) Date of Patent: Sep. 3, 2024

(54) DATA TAPE MEDIA QUALITY VALIDATION AND ACTION RECOMMENDATION

(71) Applicant: Oracle International Corporation, Redwood Shores, CA (US)

(72) Inventors: Jitesh Bakul Jhatakia, Superior, CO (US); Robert Olin Wyman, Berthoud, CO (US); Frank Patrick Abbott, Jr., Brighton, CO (US); Carl William Luehr, Erie, CO (US); Cathleen Susan Wharton, Louisville, CO (US); John Mitchell Black, III, Loveland, CO (US); Anthony Joseph Braun, Lafayette, CO (US); Scott Adrian Ellett, Broomfield, CO (US); George Edward Noble, Boulder, CO (US)

(73) Assignee: Oracle International Corporation, Redwood Shores, CA (US)

( * ) Notice: Subject to any disclaimer, the term of this patent is extended or adjusted under 35 U.S.C. 154(b) by 154 days.

(21) Appl. No.: 17/841,574

(22) Filed: Jun. 15, 2022

(65) Prior Publication Data
US 2023/0005511 A1     Jan. 5, 2023

Related U.S. Application Data

(60) Provisional application No. 63/217,040, filed on Jun. 30, 2021, provisional application No. 63/217,036, (Continued)

(51) Int. Cl.
*G11B 27/36*     (2006.01)
*G06N 20/00*     (2019.01)

(52) U.S. Cl.
CPC ............ *G11B 27/36* (2013.01); *G06N 20/00* (2019.01)

(58) Field of Classification Search
CPC ................................ G11B 27/36; G06N 20/00
See application file for complete search history.

(56) References Cited

U.S. PATENT DOCUMENTS

| 4,101,937 A | 7/1978 | Jenkins |
| 6,005,731 A | 12/1999 | Foland et al. |

(Continued)

FOREIGN PATENT DOCUMENTS

JP     2009-070482 A     4/2009

OTHER PUBLICATIONS

Mayrhauser et al., "Using a neural network to predict test case effectiveness", IEEE Aerospace Applications Conference. Proceedings, Feb. 1995, pp. 77-91.

*Primary Examiner* — Yair Leibovich
*Assistant Examiner* — Indranil Chowdhury
(74) *Attorney, Agent, or Firm* — Invoke

(57) ABSTRACT

Techniques for generating action recommendations for a data tape system are disclosed. A data tape system generates action recommendations for a data tape based on library-based metadata messages as well as a measured data quality value of the data tape. The system initiates an operation resulting in the data tape interacting with a media drive. A data tape library controller generates one or more metadata messages based on a result of a requested operation. The metadata message may include information regarding the type of error and a default recommended course of action. The system generates the recommended action for the data tape using a trained machine learning model.

18 Claims, 5 Drawing Sheets

Related U.S. Application Data filed on Jun. 30, 2021, provisional application No. 63/217,032, filed on Jun. 30, 2021.

(56) References Cited

U.S. PATENT DOCUMENTS

| | | | |
|---|---|---|---|
| 7,864,482 B1 | 1/2011 | Babinski et al. | |
| 7,933,090 B1 | 4/2011 | Jung et al. | |
| 8,108,065 B2 | 1/2012 | Greco et al. | |
| 8,406,096 B1 * | 3/2013 | Edling | G06F 11/008 |
| | | | 369/34.01 |
| 8,730,778 B2 | 5/2014 | Wharton et al. | |
| 8,842,384 B2 | 9/2014 | Jhatakia et al. | |
| 8,849,782 B2 | 9/2014 | Black, III et al. | |
| 8,849,783 B2 | 9/2014 | Abramovitz et al. | |
| 8,849,784 B2 | 9/2014 | Alber et al. | |
| 8,922,929 B1 | 12/2014 | Ruan et al. | |
| 8,976,633 B1 | 3/2015 | Ruan et al. | |
| 9,020,921 B2 | 4/2015 | Alber et al. | |
| 9,099,162 B2 | 8/2015 | Alber et al. | |
| 9,964,607 B1 * | 5/2018 | Propes | G06V 10/454 |
| 10,460,757 B1 | 10/2019 | Judd et al. | |
| 10,497,401 B1 * | 12/2019 | Liang | G11B 5/00817 |
| 10,566,022 B1 | 2/2020 | Judd et al. | |
| 10,679,658 B1 | 6/2020 | Winarski et al. | |
| 10,818,314 B1 | 10/2020 | Miyamura et al. | |
| 11,562,267 B2 * | 1/2023 | Polleri | G06N 20/00 |
| 2002/0154438 A1 | 10/2002 | Hirano et al. | |
| 2005/0044451 A1 | 2/2005 | Fry et al. | |
| 2007/0050569 A1 | 3/2007 | Haustein et al. | |
| 2007/0276991 A1 * | 11/2007 | Jaquette | G06F 21/6218 |
| | | | 711/111 |
| 2008/0055776 A1 * | 3/2008 | Findlay | G11B 23/502 |
| | | | 360/77.06 |
| 2008/0244154 A1 * | 10/2008 | Jaquette | G06F 21/6218 |
| | | | 711/E12.001 |
| 2013/0083638 A1 * | 4/2013 | Edling | G11B 15/689 |
| 2013/0339827 A1 | 12/2013 | Han et al. | |
| 2014/0146650 A1 * | 5/2014 | Alber | G11B 27/34 |
| | | | 369/53.41 |
| 2014/0327985 A1 | 11/2014 | Bui et al. | |
| 2015/0117174 A1 * | 4/2015 | Alber | G11B 17/00 |
| | | | 369/53.41 |
| 2017/0206038 A1 | 7/2017 | Bates et al. | |
| 2018/0314442 A1 | 11/2018 | Tokai et al. | |
| 2019/0221234 A1 | 7/2019 | Peng et al. | |
| 2020/0143830 A1 | 5/2020 | Judd et al. | |
| 2020/0159601 A1 * | 5/2020 | Asmussen | G06N 5/01 |
| 2020/0227091 A1 | 7/2020 | Liang et al. | |
| 2021/0081492 A1 | 3/2021 | Higginson et al. | |
| 2021/0406110 A1 | 12/2021 | Vaid et al. | |
| 2022/0067572 A1 | 3/2022 | Vaid et al. | |
| 2022/0197515 A1 * | 6/2022 | Peng | G11B 5/455 |
| 2022/0366280 A1 * | 11/2022 | Rowe | G06N 5/022 |
| 2023/0005499 A1 | 1/2023 | Jhatakia et al. | |
| 2023/0005501 A1 * | 1/2023 | Wyman | G06F 3/0686 |
| 2023/0237348 A1 * | 7/2023 | Polleri | G06N 5/022 |
| | | | 706/12 |

* cited by examiner

DATA TAPE MEDIA QUALITY VALIDATION AND ACTION RECOMMENDATION

BENEFIT CLAIMS; RELATED APPLICATIONS; INCORPORATION BY REFERENCE

This application claims the benefit of U.S. Provisional Patent Applications: 63/217,032, filed Jun. 30, 2021; 63/217,036, filed Jun. 30, 2021; and 63/217,040, filed Jun. 30, 2021, each of which are hereby incorporated by reference in their entirety.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to data tape media quality validation and action recommendation. In particular, the present disclosure relates to generating action recommendations for a data tape cartridge based on metadata obtained from a data tape library system as well as based on additional measured quality metrics of the data tape.

BACKGROUND

Magnetic tape storage provides cost and storage density advantages over many other data storage technologies. Data centers often utilize both tape storage and disk storage to complement each other. Tape storage is often used for backup and archival data storage. Disk storage is often used for more frequently accessed data storage.

Magnetic tape data storage ("data tape") uses digital recording on magnetic tape to store digital information. Tapes are packed in cartridges or cassettes. A tape drive performs read/write operations from/to the tape. A robotically-accessed tape library houses data tape cartridges to provide large quantities of data storage.

Over time, data tape quality may degrade. Degradation may be a result of physical wear in the data tape or data tape cartridge. Alternatively, the degradation may be a result of media errors, or errors in the data stored on the data tape. Data tape libraries employ monitoring systems to detect errors in read/write operations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
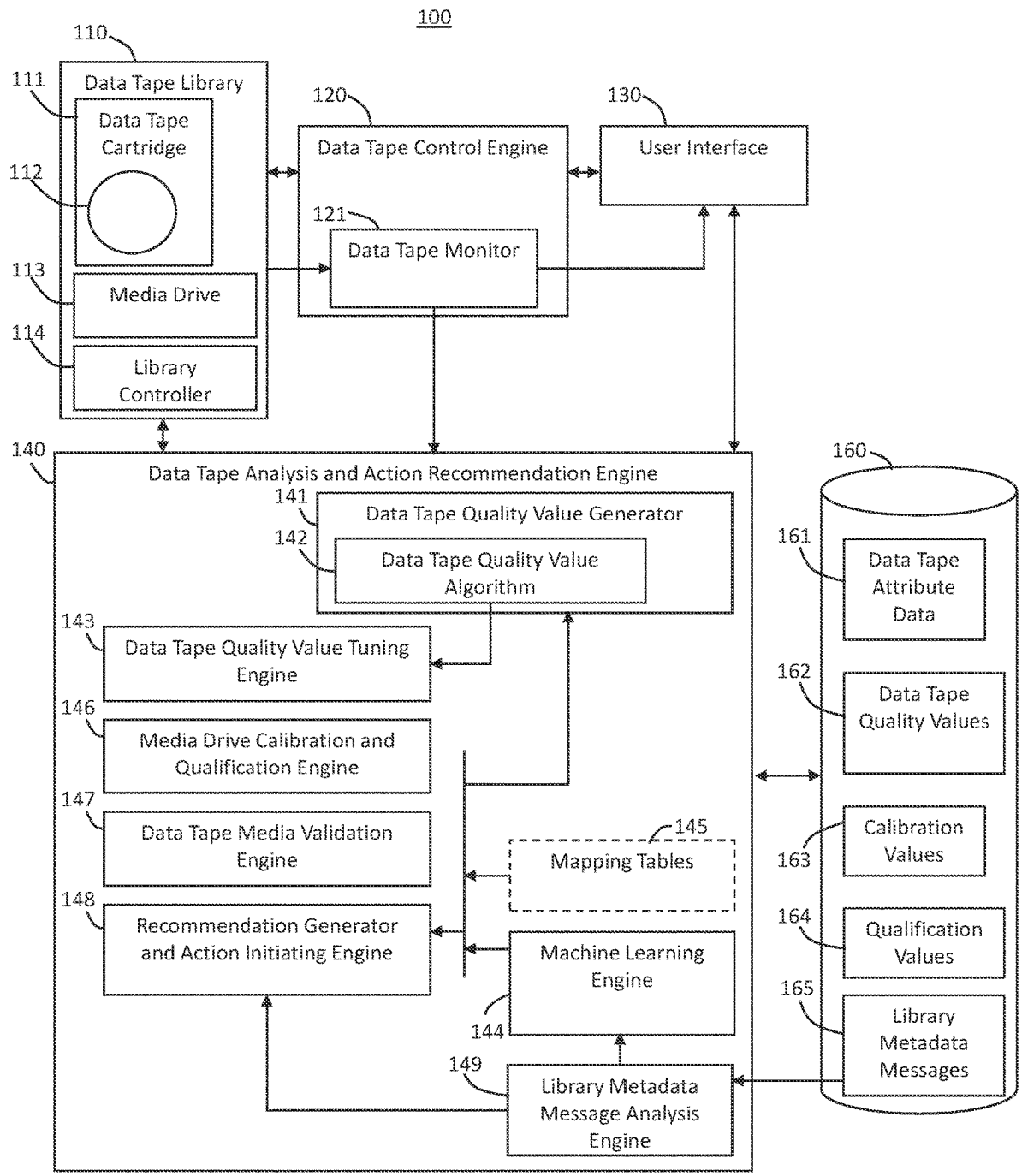
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. DATA TAPE MEDIA QUALITY VALIDATION AND ACTION RECOMMENDATION
4. TRAINING A MACHINE LEARNING MODEL
5. EXAMPLE EMBODIMENT
6. COMPUTER NETWORKS AND CLOUD NETWORKS
7. MISCELLANEOUS; EXTENSIONS
8. HARDWARE OVERVIEW

1. General Overview

Data tape libraries monitor operations of the data tapes to identify errors and failures in read/write operations from data tapes/to data tapes in the library. A system may perform a media validation of a data tape to verify that the data tape is in good condition for continued use. However, status messages generated by a data tape library in the course of read/write operations may be inadequate to properly verify the operational status of a data tape. As a result, a user may be unable to confidently use a data tape or take corrective action.

One or more embodiments include a data tape system that generates action recommendations for a data tape based on library-based metadata messages as well as a measured data quality value of the data tape. The system initiates an exchange operation resulting in the data tape interacting with a media drive. The operation may be, for example, a read operation to read data from the data tape, a write operation to write data to the data tape, or a validation operation to determine an operational status of the data tape. In a validation operation, a predetermined set of operations is performed on the data tape—such as read or write operations. However, unlike read or write operations initiated by a host application, validation operations do not necessarily result in the exchange of read or write data between the media drive and devices external to a data tape library. Instead, the operations are monitored by a data tape library controller to determine the operating status of the data tape. The data tape library controller generates one or more metadata messages based on a result of the requested operation. For example, if the requested operation is a read operation, the data tape library controller may control a robot arm to access the data tape cartridge and provide the data tape cartridge to a media drive. The media drive may attempt to read the data tape. If an error occurs at any stage of the data read process, the data tape library controller may generate a metadata message. The metadata message may include information regarding the type of error and a default recommended action.

In one embodiment, a system generates a recommended action that may be different from the default recommended action. The system-generated recommended action may be based on (1) the metadata message generated by the data tape library controller, and (2) a data tape quality value. The data tape quality value may be a value generated based on previous operations performed on the data tape. For example, the data tape quality value may be based on: (a) a particular data tape error correction value representing a history of errors associated with the data tape, (b) a particular value representing an amount of data processed (read/write operations performed on the data tape) or a length of data tape traversed during data processing operations, and (c) a scaling factor. In one or more embodiments, the data tape quality value is a data tape read quality value indicating a readability of the data tape. The scaling factor represents a relationship between the data tape error correction value, the value representing the amount of data processed in read/write operations of the data tape or the length of data tape traversed in data processing operations, and a degradation level of the data tape.

In one embodiment, the system generates the recommended action for the data tape using a trained machine learning model. The system trains the machine learning model using historical data including historical metadata messages, historical data tape quality values, and historical recommended actions. The historical data may also include information regarding whether the historical recommended actions successfully resolved errors. The system trains the machine learning model to generate recommended actions based on input data sets including a particular set of metadata messages and a particular data quality value for a data tape. In one embodiment, the system generates an expert system including a table of recommended actions corresponding to different combinations of metadata messages and data quality values.

In one embodiment, the system generates a ranking of metadata messages. The system may identify a plurality of received metadata messages and generate a recommendation only based on the highest-ranked metadata message. For example, the data tape library controller generates a first metadata message indicating that a certain number of errors occurred during a read operation. The metadata message may indicate that the errors were corrected using error correction operations. The metadata message may indicate the data tape is usable but should be monitored for an increase in errors. Another metadata message may indicate that a certain number of read errors occurred that could not be corrected by error correction operations. The metadata message may indicate that the data tape should not be used for further write operations. The system may assign a higher weight to the second metadata message based on a severity of the error in the second metadata message.

In one embodiment, the system displays a recommended action on a display device. The system may also display a confidence level associated with the recommended action. The confidence level may be based on the data tape quality value for the data tape that is the subject of the recommendation.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes a data tape library 110, a data tape control engine 120, a user interface 130, a data tape analysis and action recommendation engine 140, and a data repository 160.

The data tape control engine 120 provides commands to the library controller 114 to perform a read or write operation on the data tape 112 of the data tape cartridge 111. The library controller 114 controls a robot arm of the data tape library 110 to access the data tape cartridge 111 and insert the data tape cartridge 111 into a media drive 113 to perform the read or write operation. Once the data tape cartridge 111 is loaded into the media drive 113, the data tape control engine 120 communicates with the media drive 113 to perform the read and/or write operations. During a read operation, the media drive 113 transmits read data from the data tape 112 to the data tape control engine 120. During a write operation, the data tape control engine 120 transmits write data to the media drive 113 to write to the data tape 112. Upon completion of the read and/or write operations, the library controller 114 de-mounts the data tape cartridge 111 from the media drive 113. The library controller 114 detects, upon completion of the read and/or write operations, performance information, such as whether read and/or write operations were successful, error data, and other performance notifications. A data tape monitor 121 receives from the library controller 114 the performance information associated with the read and/or write operation. If the operation results in a hard error, such as an inability of the media drive 113 to write to, or read from, the data tape 112, the data tape monitor 121 receives an alert from the library controller 114. The alert may include a recommended action.

The library controller 114 transmits hard error alert data, advisory alert data, and informational alert data associated with read and/or write operations as metadata to the data tape control engine 120. A hard error alert may be any error that prevents read and/or write operations, such as a total loss of the data tape, mechanical malfunction, media corruption, or extreme wear of the data tape.

In one embodiment, the library controller 114 includes an application or program that analyzes the performance of the media drive 113 associated with a read and/or write operation and generates hard error alerts, advisory alerts, and informational alerts. The hard error alert may include a recommendation that the data tape should not be used to store data. The hard error alert may also include a notice that the data tape is unusable, and a read/write operation could not be carried out. An advisory alert may indicate that an error occurred during a read/write operation, but that the operation was able to be performed successfully. The advisory alert may also provide a notice that information included in the data tape should be moved to another data tape in the near future. An informational-type alert occurs when a read/write operation occurs without any errors. For example, the library controller 114 may be configured to generate an informational alert when it determines a particular distance of data tape has been read. For example, if an amount of data written to/read from a data tape corresponds to a full wrap (traversing the tape from one end to the other), the library controller 114 may generate an informational-type alert. Informational alerts may also indicate a type of data tape cartridge 111 being read from/written to, that a particular tape has been in use for a particular amount of time, or any other information that does not necessarily include a tape failure or data read/write error.

In addition to generating commands to read from/write to a data tape 112 in the data tape library 110, the data tape control engine 120 may also control operating modes and monitoring commands of the data tape library 110. For example, in a data tape analysis operating mode, the data tape control engine 120 may issue calibration commands, qualification commands, data tape quality measurement commands, or media quality commands. For example, an operator may access a graphical user interface (GUI) displayed by the user interface 130 to request a media validation of a particular data tape 112 in the data tape library 110. In the data tape analysis operating mode, the library controller 114 may return data about the state of the data tape 112 included in the media validation request without receiving any write data from the data tape control engine 120 and without transmitting any read data to the data tape control engine 120.

The data tape analysis and action recommendation engine 140 analyzes data generated by the library controller 114 and the data tape monitor 121 of the data tape control engine 120. The data tape analysis and action recommendation engine 140 includes a data tape quality value generator 141, a data tape quality value tuning engine 143, a media drive calibration and qualification engine 146, and a data tape media validation engine 147.

The data tape quality value generator 141 generates a data tape quality value based on a data tape quality value algorithm 142. The data tape quality value algorithm 142 includes values representing (a) a particular data tape error correction value, (b) a particular value representing an amount of data processed (read/write), and (c) a scaling factor. In one embodiment, the data tape quality value is a data tape read quality value indicating a readability of the data tape. The data tape read quality value may include data associated with read operations while excluding data associated with write operations. The particular data tape error correction value of the data tape quality value may be a filtered "total corrected read errors" value. The "total corrected read errors" value represents a type of read error requiring physical rewinding of the data tape to re-read a portion of the data tape that was previously read, but which resulted in an error. Filtering the total corrected read errors value includes omitting from the value the re-reads that are not necessarily the result of read errors. For example, if a tape drive is known to re-read portions of the data tape when first beginning a read operation, the re-read operations at the beginning of the read operation may be omitted from the filtered "total corrected read errors" value. Otherwise, the total corrected read errors value may be artificially inflated. The system may track an amount to data read from the data tape in read operations and/or written to the data tape in write operations to obtain the value representing an amount of data processed. Alternatively, the system may derive the value representing the amount of data processed by tracking a length of tape read from or written to, and deriving, based on a known amount of data per distance, the amount of data read from/written to the data tape.

The scaling factor is a numerical value which represents a relationship between the data tape error correction value, the value representing the amount of data processed in read and/or write operations of the data tape, and a degradation level of the data tape. The data tape analysis and action recommendation engine 140 includes a data tape quality value tuning engine 143. The data tape quality value tuning engine 143 adjusts the scaling factor for a particular data tape or set of data tapes based on data tape attribute data 161. Example data tape attribute data 161 includes: a type of data tape, a brand of data tape, a material making up the data tape, dimensions of the data tape (such as thickness, width, length), media characteristics (such as compression levels, amount of data stored, number of over-writes on the data tape), and environmental attributes (such as humidity, temperature, light levels, and magnetic field strengths of an environment in which the data tape is stored). For example, for a particular brand of data tape, storage at a higher temperature and humidity may cause the data tape to degrade more rapidly when the data tape is frequently accessed for data re-reads and re-writes. In an embodiment in which a machine learning model generates a scaling factor, the data tape quality value tuning engine 143 provides feedback to the machine learning model engine during training of the model. Based on the feedback, the machine learning model engine updates a training data set and re-trains the model.

In one embodiment, the data tape quality value algorithm 142 may be represented as:

$DTQ = 90 - \alpha*(2*TCREF/WR)^\beta$, where DTQ is the data tape quality value, $\alpha$ is a degradation co-efficient, TCREF is a filtered total corrected read error value, WR is a "wraps read" value, corresponding to the value representing the amount of read data tape, and $\beta$ is the scaling factor.

In the above equation, the value "90" defines a range of values for the data tape quality value. However, embodiments encompass any range of values. The range of potential values for a data tape quality may be set by a user, for example. The degradation coefficient is a value less than 90 that defines how much the "errors per distance" calculations (raised to the scaling factor) will increase/reduce the data tape quality value. For example, if the degradation coefficient is set to "20," then the final data tape quality value will be calculated as the "errors per distance" times 20. The degradation coefficient may be set by a user, for example, to cause the data tape quality values to fall along a desired range of values.

In one embodiment, the data tape analysis and action recommendation engine 140 includes a machine learning engine 144 for training a machine learning model to generate, for a particular set of data tape attributes, a scaling factor value. For example, the machine learning engine 144 may generate a training data set from the data tape attribute data 161 to identify sets of data tape attributes and corresponding scaling factor values. The machine learning model may be trained to identify relationships among different data tape attributes and scaling factor values. In an alternative embodiment, the data tape analysis and action recommendation engine 140 maps a particular data tape attribute or set of attributes to a particular scaling factor using a mapping table 145. The mapping table 145 may include, for example, fields representing ranges of values for data tape attributes and scaling factor values associated with the ranges of values.

The media drive calibration and qualification engine 146 performs a media drive calibration on a designated media drive 113 in the data tape library 110. For example, a data tape library 110 may include multiple media drives 113. One or more of the media drives may be designated as "validation" drives. These drives may be calibrated, using a data tape cartridge 111 having known attributes, to ensure the media drive 113 designated as a validation drive meets a threshold operation status. In addition, the validation drive may be inaccessible to host applications that read from and write to data tapes 112 in the data tape library 110. Instead, the validation drive may be accessible only by the library controller 114 for carrying out calibration, qualification (ensuring continued calibration of the media drive), and validation operations. Consequently, when a media validation is requested for a particular data tape 112, the library controller 114 selects, from among the multiple media drives 113, the media drive that is calibrated and designated as the validation drive. Since the validation drive has been calibrated, the result of the media validation operation is more likely to accurately reflect a state of the media, and not necessarily a state of the validation drive. In one or more embodiments, the library controller 114 uses a calibrated media drive 113 to perform a statistical analysis to generate the data tape quality value.

The data tape media validation engine 147 determines an operating state of a particular data tape 112 in the data tape library 110. The validation operation may be initiated by a user, by a pre-defined schedule, or by any triggering event detected by the library controller 114 or the data tape monitor 121. For example, a data tape control engine 120 may store a set of rules for determining when a validation is performed. The set of rules may include one rule to perform a validation of the data tape 112 after a predetermined number of uses of a data tape 112, another rule to perform a validation of the data tape 112 after a predetermined period of time has elapsed, and another rule to perform a validation of the data tape 112 after a predetermined number of read/write errors is detected when reading from or writing to the data tape 112.

In one embodiment, the data tape analysis and action recommendation engine 140 includes a recommendation generator and action initiating engine 148. The recommendation generator and action initiating engine 148 makes action recommendations and initiates system actions for a data tape based on (1) data tape attribute data 161, (2) data tape quality values 162, and (3) library metadata messages 165. When calibration and/or qualification operations have been performed, the action recommendations and system actions may further be generated/initiated based on media drive calibration values 163 and media drive qualification values 164.

In one embodiment, the recommendation generator and action initiating engine 148 generates a recommendation or initiates an action based on a trained machine learning model. The machine learning engine 144 may train a machine learning model to generate, for a particular data tape, an action recommendation. For example, the machine learning engine 144 may generate a training data set from the data tape attribute data 161, data tape quality values 162, and library metadata messages 165 to identify action recommendations associated with particular sets of data tape attribute data 161, data tape quality values 162, and library metadata messages 165. The machine learning model may be trained to identify relationships among different data tape attribute data 161, data tape quality values 162, and metadata messages 165 and action recommendations. In addition, the machine learning engine 144 may train the machine learning model based on data indicating whether a prescribed action resulted in a successful correction of an error or not. For example, the training data set may include the data tape attribute data 161, data tape quality values 162, and metadata messages 165, as well as an indication of the historical action recommended for the set of data tape attributes and an indication of whether the historical recommended action resulted in successful resolution of a detected error.

In an alternative embodiment, the data tape analysis and action recommendation engine 140 maps a particular set of data tape attribute data 161, data tape quality values 162, and metadata messages 165 to a particular action recommendation using a mapping table 145. The mapping table 145 may include, for example, fields representing ranges of values for data tape attributes and scaling factor values associated with the ranges of values.

In one embodiment, the data tape analysis and action recommendation engine 140 includes a library metadata message analysis engine 149. The library metadata message analysis engine 149 may analyze a library metadata message 165 and determine whether to bypass a machine learning engine 144. For example, if the data tape control engine 120 controls the data tape media validation engine 147 to initiate a media validation of a particular data tape 112, the library controller 114 may generate a hard error metadata message. The hard error metadata message may indicate that the selected data tape is no longer usable by host applications for read or write operations. Based on the particular type of library metadata message, the library metadata message analysis engine 149 may transmit the library metadata message directly to the recommendation generator and action initiating engine 148 without applying a machine learning algorithm to an input data set including the library metadata message.

In one embodiment, the recommendation generator and action initiating engine 148 stores one or more tables indicating prescribed recommendations and actions for particular sets of data tape attributes data 161, data tape quality values 162, and library metadata messages 165. The one or more tables may be generated by a machine learning model trained by the machine learning engine 144 to function as an expert system. The machine learning engine 144 may train a machine learning model to analyze historical data including the data tape attribute data 161, data tape quality values 162, and library metadata messages 165 associated with previously-encountered or analyzed data tapes. The historical data may also be obtained from additional sources, such as online libraries including historical data tape information. The machine learning engine 144 trains the machine learning model based on the historical data to generate, for different combinations of input data, corresponding action recommendations. The recommendation generator and action initiating engine 148 stores the action recommendations in the one or more tables. Upon encountering a particular set of data tape attribute data 161, data tape quality values 162, and library metadata messages 165 resulting from a data tape media validation operation, the recommendation generator and action initiating engine 148 consults the one or more tables to generate a recommendation or to initiate an action.

In one embodiment, one or more of the library metadata messages 165 may include a default recommendation. For example, the library controller 114 may generate a library metadata message indicating that a particular read error occurred and recommending cleaning of a media drive. However, the recommendation generator and action initiating engine 148 may generate a different recommendation by taking into account not only the library metadata message, but also a data tape quality value, a data tape media validation value, and a calibration value of a media drive. A machine learning model may determine that, for the particular set of input data cleaning the media drive would not necessarily resolve the error. Instead, the machine learning model may recommend cleaning a data tape.

Examples of recommendations generated by the recommendation generator and action initiating engine 148 include: (1) use a different media drive for the requested operation, (2) migrate data from the data tape to another data tape, (3) an end-of-life metric has been detected: migrate data to another data tape, (4) data tape quality is less than quality required for the stored media—replace the data tape with one of a higher quality grade, (5) wrong type of data tape detected for requested operation—change data tape, (6) data drive is incompatible with data tape—change to another data drive and repeat operation, (7) data tape read failure—migrate data to another data tape and do not use data tape, (8) recommendation not possible—type of error unknown, (9) clean media drive, (10) clean data tape, (11) re-run requested operation, (12) data encryption error encountered—re-run requested operation.

In addition to generating recommendations for addressing alerts resulting from data exchanges between the data tape library 110 and the data tape control engine 120, the data tape analysis and action recommendation engine 140 may further identify a status of a data tape, including whether the data tape is blank and whether the data tape is a virgin data tape (i.e., never written to).

The data tape analysis and action recommendation engine 140 determines whether a data tape is blank by determining whether any errors were reported in association with a read operation. If any errors were reported, the data tape is not considered blank. If no errors were detected, the data tape analysis and action recommendation engine 140 next determines how much data has been written to the data tape over the lifetime of the data tape. For example, the library controller 114 may store, for each data tape in the data tape library 110, data indicating how much data was written to each data tape. The data tape analysis and action recommendation engine 140 determines whether the amount of data written to the data tape over its lifetime is more than an amount of data that is written to data tapes to format the data tapes. If the amount of data written to the data tape over its lifetime is more than an amount of data that is written to data tapes to format the data tapes, the data tape analysis and action recommendation engine 140 determines that the data tape is not blank. The data tape analysis and action recommendation engine 140 next determines an amount of unused capacity of the data tape. If the amount of unused capacity is less than a total capacity of the data tape, then the data tape analysis and action recommendation engine 140 determines that the data tape is not blank. Otherwise, the data tape analysis and action recommendation engine 140 designates the data tape as "blank."

The data tape analysis and action recommendation engine 140 determines whether a data tape is virgin (or never written to) by determining: (a) whether any errors are reported associated with a read operation, and (b) an amount of data written to the data tape in its lifetime. If no errors are reported, and if no data has ever been written to the data tape, the data tape analysis and action recommendation engine 140 determines that the data tape is a "virgin" data tape that has never been written to.

In one or more embodiments, interface 130 refers to hardware and/or software configured to facilitate communications between a user and the data tape control engine 120 and data tape analysis and action recommendation engine 140. Interface 130 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 130 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 130 is specified in one or more other languages, such as Java, C, or C++.

In one or more embodiments, a data repository 160 is any type of storage unit and/or device (e.g., a file system, database, collection of tables, or any other storage mechanism) for storing data. Further, a data repository 160 may include multiple different storage units and/or devices. The multiple different storage units and/or devices may or may not be of the same type or located at the same physical site. Further, a data repository 160 may be implemented or may execute on the same computing system as the data tape control engine 120, the data tape library 110, or the data tape analysis and action recommendation engine 140. Alternatively, or additionally, a data repository 160 may be implemented or executed on a computing system separate from the data tape control engine 120, the data tape library 110, or the data tape analysis and action recommendation engine 140. A data repository 104 may be communicatively coupled to the data tape control engine 120, the data tape library 110, or the data tape analysis and action recommendation engine 140 via a direct connection or via a network.

Information describing the data tape attribute data 161, data tape quality values 162, calibration values 163, qualification values 164, and library metadata messages 165 may be implemented across any of components within the system 100. However, this information is illustrated within the data repository 160 for purposes of clarity and explanation.

In one or more embodiments, the data tape control engine 120, the data tape library 110, or the data tape analysis and action recommendation engine 140 refers to hardware and/or software configured to perform operations described herein for managing a data tape library 110 and analyzing data tapes. Examples of operations for analyzing data tapes of a data tape library are described below with reference to FIG. 2.

In an embodiment, the data tape control engine 120, the data tape library 110, or the data tape analysis and action recommendation engine 140 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

3. Data Tape Media Quality Validation and Action Recommendation

Figure 2:
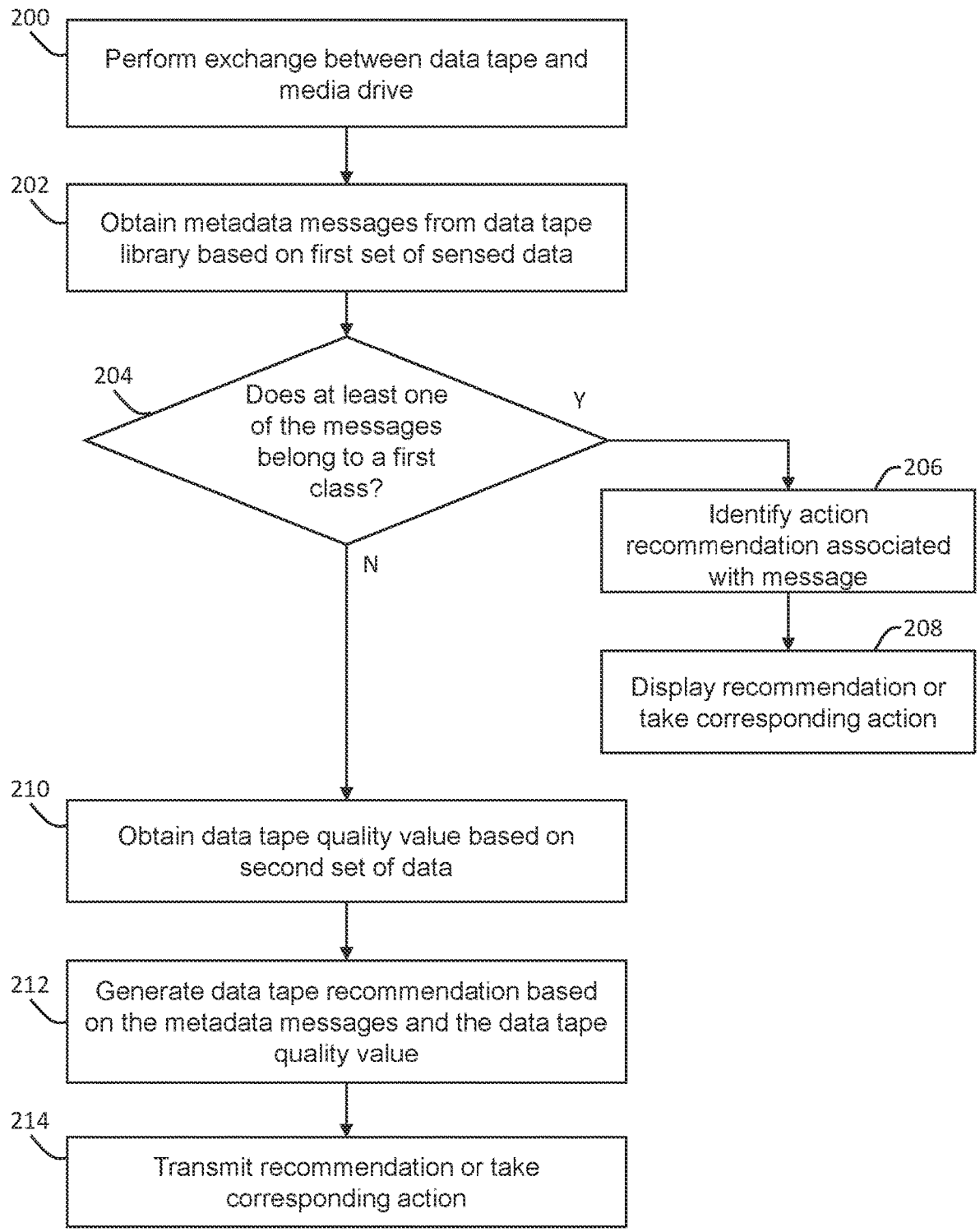
FIG. 2 illustrates an example set of operations for generating a recommendation in data tape system based on a calibration status of a media drive in accordance with one or more embodiments.

FIG. 2 illustrates an example set of operations for generating a data tape quality value in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system performs a data exchange between a data tape and a media drive (Operation 200). For example, a data tape library controller may receive instructions from a host to perform a read operation. The data tape library controller controls a robot arm to insert a data cartridge into the media drive. The data tape hosts provides instructions to the media drive to perform the read operation. The media drive outputs read data to the data tape host.

The system obtains one or more metadata messages from the data tape library based on a first set of sensed data (Operation 202). The metadata messages include messages generated by the library controller as a result of the data exchange between the media drive and the data tape host. In one embodiment, the metadata messages may be as a result of a media validation request, in which a host requests a current operating status of a particular data tape. The metadata messages do not necessarily include the particular data that is read from or written to the data tape. Instead, the metadata messages include information describing the read, write, or validation operations.

In one or more embodiments, the metadata messages include information regarding: (a) a status of a drive performing the read, write, or validation operation, (b) a status of a media (data tape or data tape cartridge) that is the subject of the read, write, or validation process, (c) a result of the read, write, or validation process (e.g., success or failure), (d) a description of any errors detected, (e) a recommended action to take as a result of the result or a detected error, and (f) additional look-up information, such as a sense key, sense code, or sense code qualifier.

In one embodiment, the system generates and/or receives the metadata messages upon completion of a data exchange between the media drive and the data tape host. For example, upon completion of a read operation in which the media drive performs, or attempts to perform, a read operation to provide read data to a data tape host, the library controller may interface with the media drive to identify any error codes or notifications generated by the media drive as a result of the read operation. According to an alternative embodiment, the system generates and/or receives the metadata messages in real-time, during a read, write, or media validation operation. According to another embodiment, the system may review logs of the metadata messages to identify previously-detected errors or a previous operational status of a data tape or media drive.

In one or more embodiments, the metadata messages include two or more types of messages associated with two or more levels of severity of an identified issue. For example, one type of alert may be a hard error alert. A data tape library generates a hard error alert when a requested read, write, or erasure operation could not be completed on the requested data tape. A hard error alert may be any error that prevents read/write operations, such as a total loss of the data tape, mechanical malfunction, media corruption, or extreme wear of the data tape. The hard error alerts may further include a recommendation to cease requesting use of the data tape for read, write, or erasure operations. Among multiple types of messages, hard error alerts are associated with the highest level of severity. Another type of alert may be an advisory alert. The advisory alert may indicate that an error occurred during a read/write operation, but that the operation was able to be performed successfully. Examples of advisory alerts include an alert that a data tape was write protected, an alert that a media drive failed to eject the data tape after an operation, an alert that read data was corrupted, an alert that a read/write operation completed successfully with one or more unsuccessful attempts, or an alert that an unknown issue prevented successful completion of a read/write operation. The advisory alert may also include one or more recommendations, such as a recommendation to migrate data from a data tape within a certain period of time, a recommendation to clean a data tape, a recommendation to repair a data tape, or a recommendation to perform a validation operation on the data tape. a notice that information included in the data tape should be moved to another data tape in the near future An informational-type alert occurs when a read/write operation occurs without any errors. For example, a library controller may be configured to generate an informational alert describing an amount of data associated with a read or write operation, an indication whether an operation was successful, a length of data tape traversed in an operation, or a status of a data tape or media drive.

The system determines whether at least one of the metadata messages belongs to a first class of metadata messages among multiple different classes of metadata messages associated, respectively, with different levels of severity (Operation 204). The first class may include, for example, a type of message indicating a critical failure of a data tape or data tape drive, rendering the data tape or the data tape drive unusable for future read or write operations.

For example, during a read operation, the data tape library may generate 10 metadata messages. Eight of the messages may correspond to alerts, such as: "read failed: data corrupted," "read successful," "read successful on third attempt," and "100 GB read."

One or more of the alerts may be associated with a respective recommendation. For example, the alert associated with the critical failure may be associated with a recommendation to immediately attempt to migrate any data from the data tape to another data tape. The alert associated with the "read successful on third attempt" message may be associated with a recommendation to clean the data tape. The alert associated with the "read failed: data corrupted: message may be associated with a recommendation to perform a validation operation on the data tape.

In one or more embodiments, a data tape library is in communication with a data tape library platform. The data tape library platform includes software and hardware for interfacing with the data tape library. The data tape library platform may correspond, for example, to the data tape analysis and action recommendation engine 140 illustrated in FIG. 1. The data tape library platform may include software and hardware providing functionality to display to a user via a graphical user interface (GUI) information about data tape cartridges, data tapes, media drives, read/write/erasure operations, and recommendations for actions associated with the data tapes and media drives. The data tape library may generate a default recommendation based on software and hardware associated with the data tape library. The data tape library platform may receive the metadata messages from the data tape library. The data tape library platform may analyze the metadata messages and default recommendations from the data tape library to determine whether to present to a user one of the default recommendations or whether to present an alternative recommendation.

Based on determining at least one message belongs to the first class of messages, the system identifies the action recommendation associated with the message (Operation 206). For example, if the metadata message indicates the error is associated with a critical failure of a media drive, the system may identify the corresponding recommended action, generated by a data tape library together with the metadata message, to remove the data tape from the media drive, attempt the read, write or validation operation in another media drive, and refrain from using the media drive in future read, write, or validation operations.

The system displays the recommended action on a GUI or automatically initiates the recommended action (Operation 208). For example, upon receiving the metadata message and identifying the recommended actions, the system may automatically remove the data tape from the media drive and display a notification on a GUI describing the error and awaiting operator input whether to initiate a read, write, or verification operation on another media drive.

In one or more embodiments, a library controller generates multiple metadata messages associated with the same read, write, or validation operation. The system may identify a weight value associated with each metadata message and initiate or recommend an action only based on the metadata message having the highest weight value. For example, the library controller may generate one metadata message with a recommendation to refrain from writing to a particular data tape and another metadata message with a recommendation to re-run a validation operation on the data tape. The system may identify the former metadata message as having a higher weight value. Consequently, the system may refrain from performing additional write operations to the data tape, and the system may refrain from performing another validation operation on the data tape.

Upon determining that the metadata messages do not include any metadata message associated with the first class of messages, the system obtains a data tape quality value based on a second set of data (Operation 210). According to one embodiment, the first class of messages is a high-severity-type error message. If the system determines that the metadata messages include alert-type or informational-type messages that do not include any high-severity-type error messages, the system may obtain the data tape quality value. The system may either retrieve a previously generated data tape quality value or generate a new data tape quality value.

The data tape quality value may be based on: (a) a particular data tape error correction value representing detected errors associated with the data tape, (b) a particular value representing an amount of data processed (read/write operations performed on the data tape), and (c) a scaling factor. The scaling factor represents a relationship between the data tape error correction value, the value representing the amount of data processed in read/write operations of the data tape, and a degradation level of the data tape.

According to one embodiment, the system calculates the data tape quality value based on an algorithm that includes a degradation coefficient. The algorithm may raise a product of (a) the particular data tape error correction value and (b) the particular value representing the amount data processed to an exponent value equal to the scaling factor. The degradation coefficient may be applied to the product of the data tape error correction value and the value representing the amount of data processed to indicate a weight applied to the product to generate the data tape quality value.

In one embodiment, the data tape quality value is a data tape read quality value representing a readability of the data tape. The data tape read quality value may be generated without data representing write operations associated with the data tape. According to an alternative embodiment, the data tape quality value may include write data. A data tape quality value including write data may indicate a ratio of an actual density of recorded data to a maximum recordable density of data.

The system may calculate the particular data tape error correction value based on tracking data tape errors associated with the data tape over time. The system may assign different weights to different types of errors. For example, the system may assign a greater weight to detected read errors that delay a read operation beyond a threshold delay time than to read errors that delay the read operation below the threshold delay time. For example, one read error may result in restarting a read operation, while another read error may be corrected using error correction processes without requiring restarting of the read operation. The system may store values representing types of read/write/erasure errors and a frequency of the errors. The system may calculate the particular data tape error correction value based on the stored information associated with the type and frequency of read, write, and/or erasure errors.

In one embodiment, the particular data tape error correction value is a filtered "total corrected read errors" value. The "total corrected read errors" value represents a type of read error requiring physical rewinding of the data tape to re-read a portion of the data tape that was previously read, but which resulted in an error. Filtering the total corrected read errors value includes omitting from the value the re-reads that are not necessarily the result of read errors. For example, if a tape drive is known to re-read portions of the data tape when first beginning a read operation, the re-read operations at the beginning of the read operation may be omitted from the filtered "total corrected read errors" value. Otherwise, the total corrected read errors value may be artificially inflated.

The system calculates the value representing the amount to data processed by tracking the data tape usage over time. According to one embodiment, the value representing the amount of data processed is measured in units of data, such as bytes (e.g., gigabytes, terabytes, etc.) Alternatively, the system may derive the value representing the amount of data processed by tracking a length of tape read from or written to, and deriving, based on a known amount of data per distance, the amount of data read from/written to the data tape. For example, the system may track read and/or write operations spanning 100 meters over time. It is noted that the tracked read/write distance may be more than, or less than, a total length of the data tape. For example, if a data tape has a length of 10 meters, the system may track a series of operations over time, each of which corresponds to a read/write distance (e.g., the distance of the data tape passing over a read/write head of a media drive) less than 10 meters. The sum of the read/write distances associated with the series of operations may add up to 100 meters.

The system generates the scaling factor by applying a trained machine learning model to attributes of a data tape.

The model generates a scaling factor for a particular data tape based on the attributes of the particular data tape. The scaling factor may be set by either a preproduction process (default scaling factor) or later as a sensitivity adjustment by a user or service provider. The scaling factor may also be set by an expert system via machine learning. The system may derive the scaling factor from a set of exchanges between data tapes and media drives. In one embodiment, attributes of data tapes used to define a scaling factor for a particular data tape or set of data tapes is collected at the end of an exchange between a data tape and a media drive.

The system generates a data tape recommendation or initiates an action based on (a) the metadata messages and (b) the data tape quality value (Operation 212). In one embodiment, the system generates the recommended action for the data tape using a trained machine learning model. The system trains the machine learning model using historical data including historical metadata messages, historical data tape quality values, and historical recommended actions. The historical data may also include information regarding whether the historical recommended actions successfully resolved errors. The system trains the machine learning model to generate recommended actions based on input data sets including a particular set of metadata messages and a particular data quality value for a data tape. In one embodiment, the system generates an expert system including a table of recommended actions corresponding to different combinations of metadata messages and data quality values.

In one embodiment, the system applies a machine learning model to a data set including: (a) one or more metadata message generated by a data tape library controller and (b) a data tape quality value for the particular data tape. The data set may further include: (c) a media validation value for the data tape and (d) calibration and/or qualification values for a media drive that performed the read, write, or media validation operation.

In another embodiment, the system refers to a table previously-generated using a machine learning model. The table may consider the data inputs (a)-(d), described above. For example, the table may indicate that if the data tape quality value is below a threshold level, generate a first recommendation when a first metadata message is received. The table may indicate that if the data tape quality value is above the threshold level, generate a second recommendation when the first metadata message is received. The table may indicate that when two metadata messages are received based on the same read, write, or validation operation, then the weights assigned to the messages, and the corresponding recommended actions associated with the messages, should depend on one or more additional factors. For example, the system may determine that if the data tape quality value is below a threshold level, a greater weight should be assigned to a first metadata message associated with a first error type than a second metadata message associated with a second error type. The system may further determine that if the data tape quality value is above the threshold level, a greater weight should be assigned to the second metadata message than the first metadata message. In one embodiment, the system generates a recommendation or initiates an action based on only the metadata message having the highest weight.

In one embodiment, metadata messages may include default recommended actions. Based at least on the data tape quality value, the system-generated action recommendations may differ from the default recommended actions. In other words, a data tape library controller may generate a default recommendation based on a detected error. A recommendation engine according to one embodiment receives the metadata message including the detected error and default recommendation. The recommendation engine generates a recommendation different from the default recommendation based on both the metadata message and additional data. The additional data includes, for example the data tape quality value, and one or both of a media validation value and a media drive calibration or qualification value. For example, a library controller may generate one or more metadata messages subsequent to a data tape/media drive exchange indicating that a particular data tape is functioning properly. The library controller may generate a default recommendation to continue using the data tape based on the determination that the data tape is functioning properly. Based on applying the metadata messages and a data tape quality value as input data to a machine learning model, the system may determine that the data tape has reached an end of life specification based on the amount of data written to/read from the data tape. Accordingly, the system may generate an alternative recommendation, different from the default recommendation, to transfer the data from the data tape to a new data tape.

In one or more embodiments, the system generates a recommendation for an action associated with a data tape based on performing a media validation operation. The system may perform the media validation operation and generate the corresponding recommendation only when a minimum amount of data has been processed using the data tape. For example, the system may calculate a "wraps read" metric. A "wrap" may be defined as a distance from one end of the data tape to the opposite end and back. The "wraps read" metric may be measured by measuring a number of rotations of the data tape to determine a distance of data tape that has been read from or written to. Alternatively, the "wraps read" metric may be calculated based on an amount of data written to and read from the data tape. For example, the system may calculate the "wraps read" metric by dividing a total amount of storage space on the data tape by an amount of data read from, or written to, the data tape. If the amount of data read from, or written to, the data tape is twice the amount of data storage space on the data tape, the system may determine that an equivalent of "one wrap" has been read from, or written to, the data tape. In one embodiment, the system only generates a recommendation or initiates an action once a minimum threshold number of wraps has been read. For example, the system may define 0.5 wraps (or an equivalent of a distance from one end of the data tape to the other) as the minimum amount of data read from or written to the data tape that is required to generate a recommendation. If the minimum wraps read threshold has not been met, the system may generate a notification to a display indicating that a media validation operation cannot be performed, and the corresponding recommendation for the data tape cannot be generated.

In one or more embodiments, the system selects a subset of actions to recommend from among a superset of candidate actions. The superset of candidate actions may include recommended actions associated with metadata messages generated by a library controller. For example, upon performing a read/write operation, the library controller may generate 6 different metadata messages associated with 3 different recommended actions, including cleaning a data tape, validating the data tape, and copying the data from the data tape to a new data tape. The system may identify a weight value associated with each recommendation. According to one embodiment, the system calculates the weight value based on a severity of an error associated with a metadata message. For example, an error indicating that a portion of a read request had to be repeated three times prior to achieving a successful read request may be determined to be more severe than an error indicating that a read operation encountered data loss within a threshold amount. Accordingly, the system may assign a greater weight to the recommendation associated with the error indicating that a portion of a read request had to be repeated three times than to the error indicating that a read operation encountered data loss. The system may select as a recommended action the action associated with the greater weight value. For example, the error indicating that a portion of a read request had to be repeated three times may be associated with a recommended action to perform a validation operation on a data tape. The error indicating that a read operation encountered data loss may be associated with a recommended action to clean the data tape. Since the error indicating that a portion of a read request had to be repeated three times is associated with a greater weight value, the system may recommend validating the data tape as an action to perform. The system may refrain from recommending cleaning the data tape as an action to perform. According to one embodiment, the system generates a single recommendation from among the superset of recommendations associated with the metadata messages. The system may select the single recommendation based on its highest weight value among all the candidate recommendations associated with a set of metadata messages. According to an alternative embodiment, the system generates two or more recommendations from among the superset of candidate operations, based on determining that the two or more operations do not conflict. According to yet another embodiment, the system generates a ranked list of two or more recommendations from among the superset of candidate operations, based on determining that the two or more operations do not conflict. In these example embodiments, if two recommendations conflict (e.g., one recommendation is to transfer all the data from one data tape to another and stop using the data tape, and another recommendation is to re-evaluate the data tape after another 10 uses), the system may refrain from presenting the recommendation associated with the lower weight value.

Upon generating an action recommendation, the system transmits the recommendation to a user interface or initiates the recommended action (Operation 214). For example, if the recommended action is to begin to migrate data from a particular data tape, the system may generate a notification to a user interface to allow an operator to flag a particular data tape for data migration, to select another data tape to receive the data, and to select a time for data migration. Alternatively, the system may automatically initiate an action. For example, if the recommended action is to clean a media drive, the system may, without intervening user input, clean the media drive. If the recommended action is to re-run a media validation operation, the system may, without intervening user input, re-run the media validation operation a predetermined number of times.

According to one or more embodiments, the system generates a confidence score associated with a recommendation presented to a user. The confidence score may be based on the data tape quality value of the data tape associated with the recommendation. For example, the system may present to the user a highest-ranked recommendation to inspect a data tape. If the associated data tape has a high data tape quality value, the system may provide a low confidence score associated with the recommendation, indicating that based on the high data tape quality value, it is unlikely that a problem detected during a data tape/media drive exchange originated with the data tape. Conversely, if the associated data tape has a low data tape quality value, the system may provide a high confidence score associated with the recommendation, indicating that based on the low data tape quality value, it is likely a problem detected during a data tape/media drive exchange originated with the data tape.

While FIG. 2 describes an embodiment in which a data tape quality value is considered when generating an action recommendation only for a particular class of metadata messages from a data tape library, in one or more embodiments, the system may always consider the data tape quality value when generating recommendations. In other words, in one embodiment, the system receives one or more metadata messages based on a read, write, or validation operation and proceeds to operation 210 to obtain a data tape quality value for the data tape that is the subject of the read, write, or validation operation.

4. Training a Machine Learning Model

Figure 3:
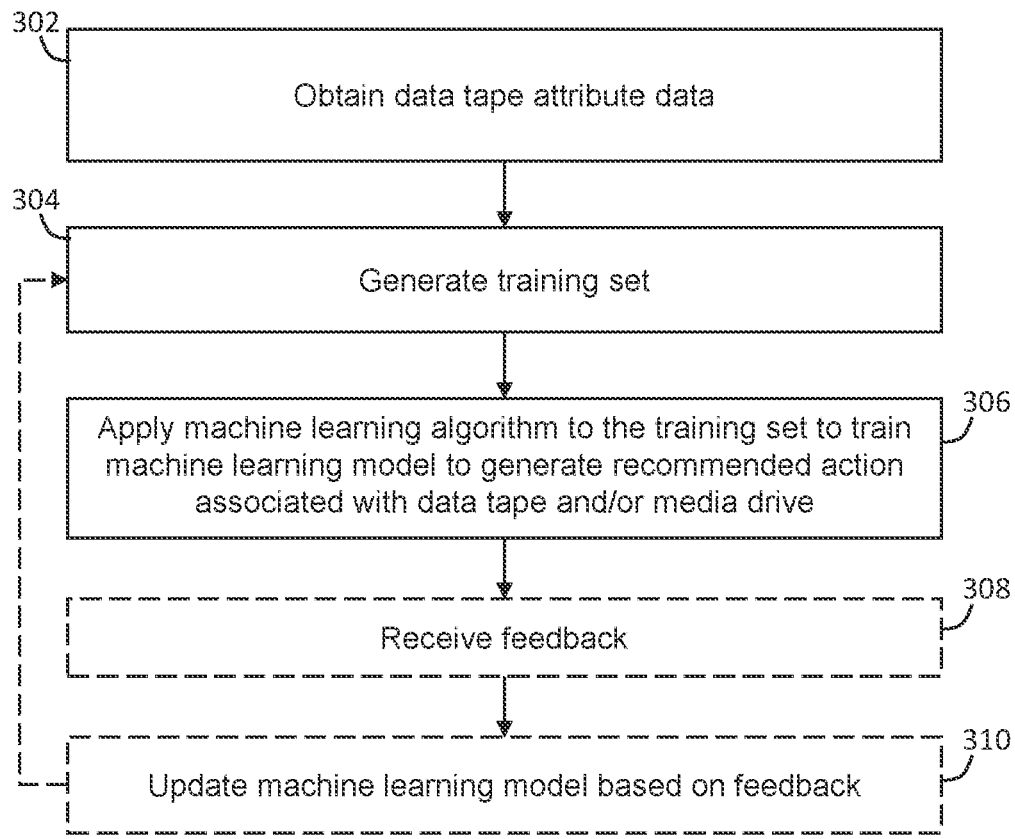
FIG. 3 illustrates an example set of operations for training a machine learning model to generate a recommended action for a data tape and/or media drive in accordance with one or more embodiments.

FIG. 3 illustrates an example set of operations for training a machine learning model in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

A system obtains historical data tape attribute data (Operation 302). The historical data tape attribute data includes data associated with historical exchanges between data tapes and media drives. For each exchange, the system may identify: (a) a brand of data tape being accessed in a media access operation, (b) particular characteristics of the data tape, such as length, width of tape, tape material, tape thickness, and (c) historical quality information about the data tape. The system may further identify environmental conditions in which the tape is stored, such as temperature, humidity, and electromagnetic activity. Data tape attribute data may be obtained from one or more databases, data repositories, or product specifications. In addition, or in the alternative, data tape attribute data may be measured by the system. The system may collect and store additional data tape attribute data after each exchange between a data tape and a media drive in the system. The system may add the newly-obtained attribute data to the historical data tape attribute data. Examples of data tape attribute data include a number of write operations, amount of write data, tape distance associated with amount of write data, number of read operations, amount of read data, tape distance associated with amount of read data, number of erasure operations, amount of data erased, tape distance associated with amount of data erased, age of data tape, data tape type, data tape material, and data encoding type on data tape.

According to one or more embodiments, the historical data tape attribute data includes metadata messages generated by a data tape library subsequent to performing a read, write, erasure, validation, or calibration operation. The historical data tape attribute data may further include a historical data tape quality value associated with a particular data tape at a particular point in time.

The system generates a training data set (Operation 304). The training data set includes a plurality of pairs of (a) historical data tape attribute data for a particular data tape, and (b) a recommended action associated with the data tape attribute data. For example, one data point in the training data set may include a plurality of metadata messages associated with a read/write exchange between a media drive and a data tape, a plurality of candidate recommendations associated, respectively, with the plurality of metadata messages, a data tape quality value associated with the data tape, and a historical recommended action.

The historical data tape attribute data from which the training data set is generated may include the attribute data of other data tapes in a data tape library, of data tapes in other data tape libraries, and other attribute data from data tapes within the system or in other systems. For example, the system may access a database via a network, such as the Internet, to obtain attribute data for other data tapes. The historical scaling factors may be human-generated or machine-generated by machine learning models associated with the historical data tape systems.

The system trains the machine learning model by applying a machine learning algorithm to identify relationships between different data tape attributes and selected recommendations (Operation 306). The machine learning algorithm analyzes the training data set to identify data and patterns between sets of data tape attributes and selected recommendations. Examples of types of machine learning models include, but are not limited to, linear regression, logistic regression, linear discriminant analysis, classification and regression trees, naïve Bayes, k-nearest neighbors, learning vector quantization, support vector machine, bagging and random forest, boosting, backpropagation, and/or clustering.

In examples of supervised machine learning algorithms, the system may obtain feedback on the recommendations presented for sets of data tape attributes (operation 308). The feedback may affirm that a generated recommendation corresponds to the set of data tape attributes. In other examples, the feedback may indicate that a selected recommendation is not valid for a particular set of data tape attributes. In this latter situation, a user may replace a recommended action generated by the machine learning algorithm with an alternative recommended action. Based on the detected similarities and/or feedback, the machine learning training set may be updated, thereby improving its analytical accuracy (Operation 310). Once updated, the ML model may be further training by optionally applying it to additional training materials.

Upon completion of the training, the system applies the trained machine learning model to particular sets of attribute data associated with a particular data tapes to generate recommended actions for the particular sets of attribute data.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4:
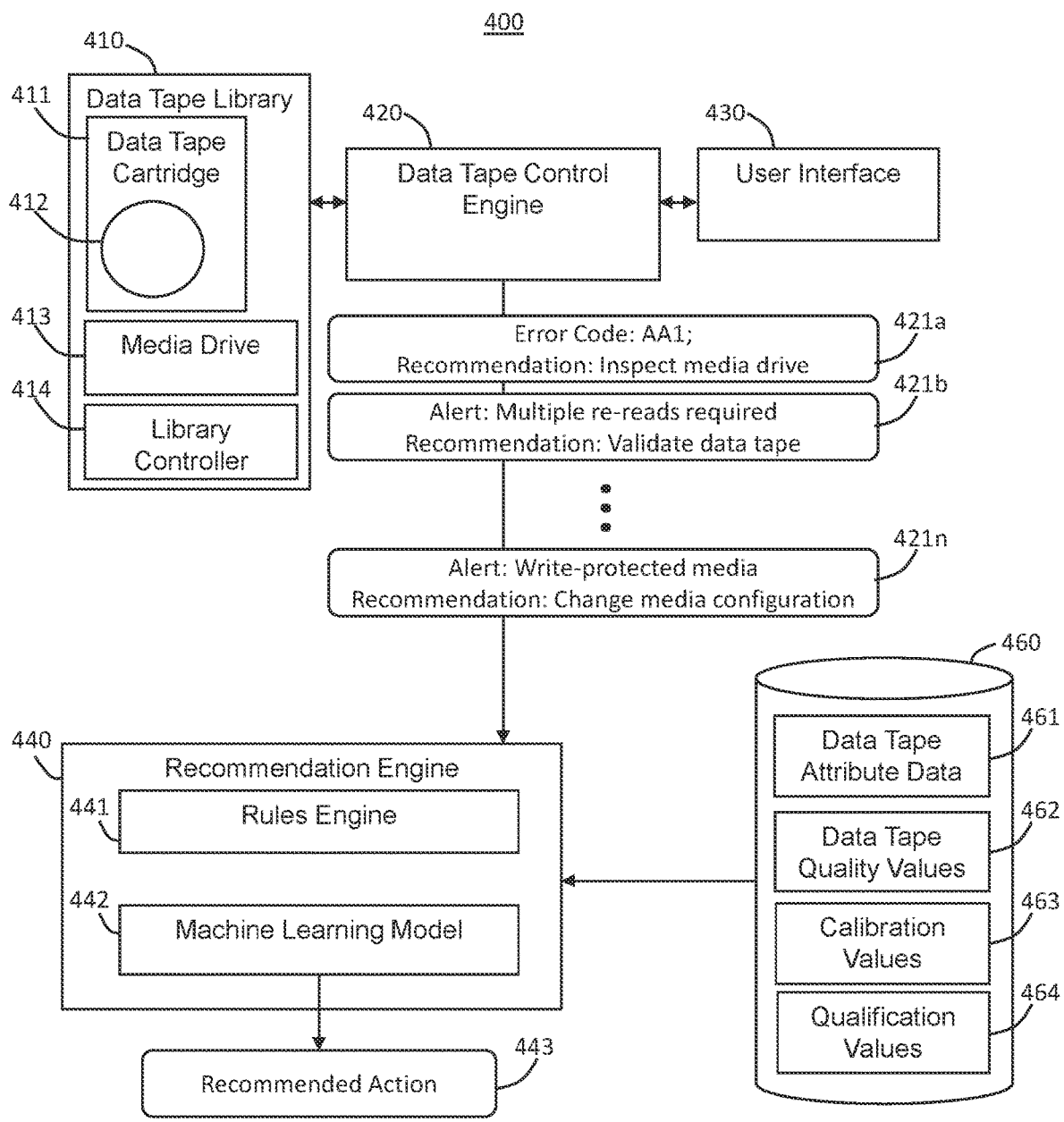
FIG. 4 illustrates an example embodiment.

FIG. 4 illustrates a system 400 that generates a recommendation for one or both of a data tape and a media drive based on data obtained from a performed operation, according to an example embodiment.

A data tape library 410 includes a plurality of data tape cartridges 411. Upon receiving a request to perform a read/write operation, a library controller 414 controls a robot arm or other movement mechanism to select a data tape cartridge 411 and insert the data tape cartridge into a media drive 413. The media drive 413 performs the read/write operation on the data tape 412. As the media drive 413 performs the read/write operation, the library controller 414 detects events associated with the read/write operation. In the example embodiment illustrated in FIG. 4, the library controller 414 detects a set of events associated with an error code and multiple alerts. The library controller 414 transmits metadata messages 421a-421n to the data tape control engine 420 together with read data and/or a confirmation of written data.

The library controller 414 associates default recommendations with the errors and/or alerts. The default recommendations may be maintained in a table. For example, during operation, the media drive 413 may output the error code "AA1." The error code may not be associated with the specifics of the event associated with the error code. According to an alternative example embodiment, the error code may be a sense code, such as 0x0D, 0x3A, etc. The library controller 414 consults a table to identify a default recommended action associated with the error code AA1: Inspect Media Drive. The library controller 414 transmits to the data tape control engine 420 a metadata message 421a that specifies the error code AA1 and the corresponding default recommended action. Similarly, during operation, the media drive 413 outputs another error code. The library controller 414 consults a table to identify an alert: "Multiple re-reads required" associated with the error code. The library controller 414 further consults a table to identify a default recommended action "validate data tape" associated with the alert. The library controller 414 transmits to the data tape control engine 420 a metadata message 421b including the alert and the default recommended action.

The data tape control engine 420 feeds the metadata messages 421a-421n, including the associated default recommendations, to the recommendation engine 440. The recommendation engine 440 applies a set of rules to the metadata messages 421a-421n via rules engine 441 to determine whether to apply the metadata messages 421a-421n to a machine learning model 442 to generate a recommendation. In particular, the rules engine 441 determines whether any of the metadata messages 421a-421n is associated with a critical error. The rules engine 441 applies a set of rules that categorizes error codes and alerts as either "critical" errors or "non-critical" errors. A critical-type error may be an error that prevents the media drive 413 from completing a requested read/write operation. A non-critical error may be an error that is encountered during the read/write operation, but that does not prevent the media drive 413 from completing the read/write operation.

If the rules engine 441 determines that one or more metadata messages is associated with a critical-type error, the rules engine 441 applies a set of rules to (a) rank the critical-type errors, and (b) generate a recommendation based on the ranking. When the rules engine 441 detects a critical-type error, the recommendation engine 440 may bypass the machine learning model 442 to generate a recommended action 443. For example, the rules engine 441 may apply a set of rules specifying that the recommendation engine will generate only one recommended action 443 based on detecting a plurality of errors and/or alerts. The rules engine 441 may detect three critical-type errors. The rules engine 441 ranks the errors according to predefined criteria. For example, the predefined criteria may rank the errors according to a severity of the detected errors. The rules engine 441 selects only the highest-ranked error to perform a corresponding default recommended action. The recommendation engine 440 generates the recommended action 443 based on the default recommended action associated with the highest-ranked error identified by the rules engine 441.

In the particular example embodiment illustrated in FIG. 4, the rules engine determines that none of the metadata messages 421a-421n associated with a particular read/write operation is a critical-type error. In response to determining that none of the metadata messages 421a-421n associated with a particular read/write operation is a critical-type error, the recommendation engine 440 applies the metadata messages 421a-421n and additional data to the machine learning model 442 to generate a recommended action 443. The additional data includes at least a data tape quality value 462 for the particular data tape 412 associated with the read/write operation performed by the data tape library 410. The additional data may further include a calibration value 463 or qualification value 464 of a media drive 413 associated with the read/write operation, and/or data tape attribute data 461. Example data tape attribute data 461 includes: a type of data tape, a brand of data tape, a material making up the data tape, dimensions of the data tape (such as thickness, width, length), media characteristics (such as compression levels, amount of data stored, number of over-writes on the data tape), and environmental attributes (such as humidity, temperature, light levels, and magnetic field strengths of an environment in which the data tape is stored). The data tape attribute data 461, data tape quality value 462, calibration value 463, and qualification value 464 may be stored in a data repository 460.

The machine learning model 442 generates a recommended action 443 based on (a) the metadata messages 421a-421n, (b) the data tape quality value 462 of the data tape 412, and optionally based on one or more of the calibration value 463 or qualification value 464 associated with the media drive 413 and the data tape attribute data 461 associated with the data tape 412. In the embodiment illustrated in FIG. 4, the recommendation engine 440 generates only a single recommended action 443 in response to receiving as input multiple metadata messages 421a-421n and multiple different default recommended actions. According to an alternative example embodiment, the recommendation engine 440 may generate a set of ranked recommended actions. The system 400 presents the recommended action 443 to a user via the user interface 430.

According to the example embodiment illustrated in FIG. 4, the machine learning model 442 is a trained model that receives as input data an input vector based on (a) the metadata messages 421a-421n and (b) the data tape quality value 462 for the data tape 412. The machine learning model 442 may also receive as input data vector values associated with a calibration value 463, a qualification value 464, and/or data tape attribute data 461. The machine learning model 442 runs the input vector through a neural network to generate an output value specifying the recommended action 443. For example, an output layer of the machine learning model may comprise twenty neurons, each associated with a different recommended action.

According to an alternative example embodiment, the machine learning model 442 may generate an expert system. For example, the rules engine 441 may be embodied as the expert system. The recommendation engine 440 applies the input data, including the metadata messages 421a-421n, to the expert system to generate the recommended action 443. The machine learning model 442 may be applied to a data set including every known error code and alert generated by the library controller 414. The data set may further include media drive calibration values 463 and qualification values 464. The data set may further include data tape quality values 462 and attribute data 461. The machine learning model 442 generates a set of rules identifying, for each recommended action, a set of (a) metadata messages, (b) data tape attribute data, (c) data tape quality values, (d) calibration values, and (e) qualification values. According to this alternative embodiment, during operation, the recommendation engine 440 applies the metadata messages 421a-421n and additional data tape data and media drive data to the expert system. The expert system matches the input metadata messages 421a-421n and additional data tape data and media drive data to a corresponding recommended action 443. Instead of applying the input data to a neural network, the recommendation engine 440 applies a set of rules, generated by a machine learning model, to the input data.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
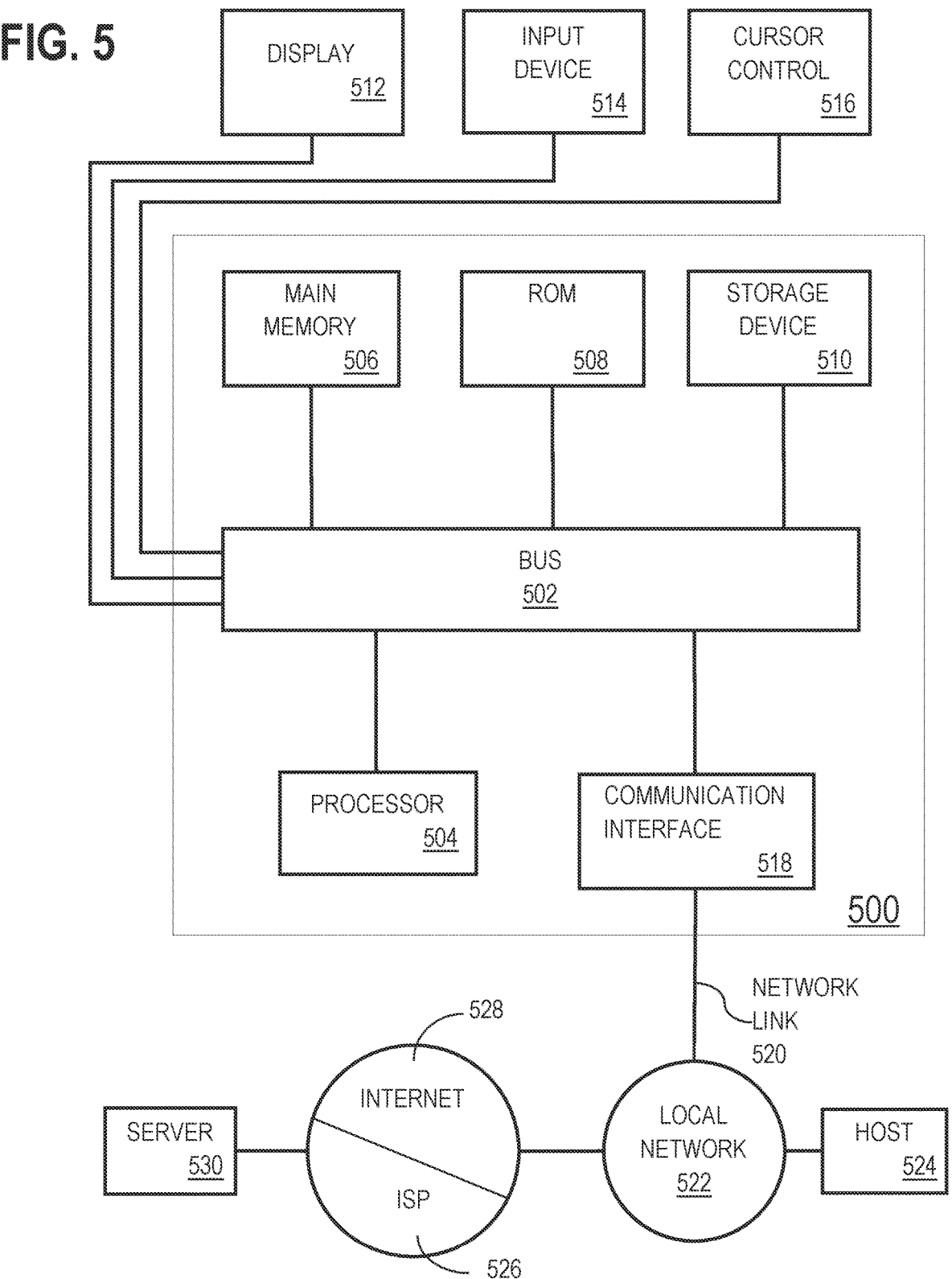
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    training a machine learning model to generate action recommendations for data tape cartridges in a data tape system at least by:
        obtaining from a data repository system a training data set comprising:
            data tape attribute data for the data tape cartridges corresponding to historical exchanges between the data tape cartridges and media drives, wherein the data tape attribute data includes at least:
                metadata message attribute data for historical metadata messages corresponding to the historical exchanges between the data tape cartridges and the media drives; and
                quality information about the data tape cartridges; and
            recommended actions for the data tape cartridges corresponding to the historical metadata messages;
        applying a machine learning algorithm to the training data set to train the machine learning model to generate the recommendations;
    obtaining, in real-time, from the data tape system, for a data tape cartridge, at least one metadata message based on a first set of sensed data associated with an interaction of the data tape cartridge with a first media drive;
    obtaining a data tape quality value based on a second set of sensed data associated with the data tape cartridge, the second set of sensed data based on additional interactions of the data tape cartridge with one or more media drives, including the first media drive; and
    applying the machine learning model to (1) first attribute data from the at least one metadata message, and (2) the data tape quality value, to generate a first action recommendation for the data tape cartridge.

2. The non-transitory computer readable medium of claim 1, wherein the at least one metadata message comprises a plurality of metadata messages,
    wherein the machine learning model is configured to identify a particular metadata message among the plurality of metadata messages as having a priority over each other metadata message among the plurality of metadata messages, and
    wherein the machine learning model is configured to generate the first action recommendation based on a recommendation mapped to the particular metadata message.

3. The non-transitory computer readable medium of claim 1, wherein generating the first action recommendation comprises:
    mapping to a second action recommendation, by the machine learning model, a data set including (1) the first attribute data from the at least one metadata message, and (2) the data tape quality value,
    wherein the at least one metadata message includes a default action recommendation,
    wherein the first action recommendation is selected, by the machine learning model, from among a set of action recommendations including the default action recommendation, and
    wherein the first action recommendation is different from the default action recommendation.

4. The non-transitory computer readable medium of claim 3, wherein the at least one metadata message is a metadata message indicating the data tape cartridge is at an end-of-life, wherein the default action recommendation is to migrate data from the data tape cartridge to another data tape cartridge, and wherein, based on the data tape quality value indicating the data tape cartridge is in usable condition, the first action recommendation does not include migrating the data from the data tape cartridge to another data tape cartridge.

5. The non-transitory computer readable medium of claim 1, wherein the operations further comprise:

providing the first action recommendation to a graphical user interface (GUI); and providing to the GUI, together with the first action recommendation, a confidence score associated with the first action recommendation, the confidence score based on the data tape quality value.

6. The non-transitory computer readable medium of claim 5, wherein the confidence score is further based on at least one of: (a) a calibration score associated with the first media drive, and (b) a qualification score associated with the first media drive.

7. The non-transitory computer readable medium of claim 1, wherein the interaction of the data tape cartridge with the first media drive includes performing an operation to read data from the data tape cartridge or to write data to the data tape cartridge, wherein the first action recommendation includes at least one of:

(1) use a different media drive to perform the operation,
(2) migrate data from the data tape cartridge to another data tape cartridge,
(3) replace the data tape cartridge with another data tape cartridge having a higher quality grade,
(4) replace the data tape cartridge with another data tape cartridge compatible with the first media drive, and repeat the operation,
(5) migrate data to another data tape cartridge and do not use the data tape cartridge,
(6) clean the first media drive,
(7) clean a data tape of the data tape cartridge, and
(8) operation failure—re-run the operation.

8. A method, comprising:

training a machine learning model to generate action recommendations for data tape cartridges in a data tape system at least by:

obtaining from a data repository system a training data set comprising:

data tape attribute data for the data tape cartridges corresponding to historical exchanges between the data tape cartridges and media drives, wherein the data tape attribute data includes at least:

metadata message attribute data for historical metadata messages corresponding to the historical exchanges between the data tape cartridges and the media drives; and quality information about the data tape cartridges; and recommended actions for the data tape cartridges corresponding to the historical metadata messages;

applying a machine learning algorithm to the training data set to train the machine learning model to generate the recommendations;

obtaining, in real-time, from the data tape system, for a data tape cartridge, at least one metadata message based on a first set of sensed data associated with an interaction of the data tape cartridge with a first media drive;

obtaining a data tape quality value based on a second set of sensed data associated with the data tape cartridge, the second set of sensed data based on additional interactions of the data tape cartridge with one or more media drives, including the first media drive; and applying the machine learning model to (1) first attribute data from the at least one metadata message, and (2) the data tape quality value, to generate a first action recommendation for the data tape cartridge.

9. The method of claim 8, wherein the at least one metadata message comprises a plurality of metadata messages, and wherein the machine learning model is configured to identify a particular metadata message among the plurality of metadata messages as having a priority over each other metadata message among the plurality of metadata messages, and wherein the machine learning model is configured to generate the first action recommendation based on a recommendation mapped to the particular metadata message.

10. The method of claim 8, wherein generating the first action recommendation comprises:

mapping to a second action recommendation, by the machine learning model, a data set including (1) the first attribute data from the at least one metadata message, and (2) the data tape quality value, wherein the at least one metadata message includes a default action recommendation, wherein the first action recommendation is selected, by the machine learning model, from among a set of action recommendations including the default action recommendation, and wherein the first action recommendation is different from the default action recommendation.

11. The method of claim 10, wherein the at least one metadata message is a metadata message indicating the data tape cartridge is at an end-of-life, wherein the default action recommendation is to migrate data from the data tape cartridge to another data tape cartridge, and wherein, based on the data tape quality value indicating the data tape cartridge is in usable condition, the first action recommendation does not include migrating the data from the data tape cartridge to another data tape cartridge.

12. The method of claim 8, further comprising:

providing the first action recommendation to a graphical user interface (GUI); and providing to the GUI, together with the first action recommendation, a confidence score associated with the first action recommendation, the confidence score based on the data tape quality value.

13. The method of claim 12, wherein the confidence score is further based on at least one of: (a) a calibration score associated with the first media drive, and (b) a qualification score associated with the first media drive.

14. A system, comprising:

one or more processors; and memory storing instructions that, when executed by the one or more processors, cause the system to perform operations comprising:

training a machine learning model to generate action recommendations for data tape cartridges in a data tape system at least by:

obtaining from a data repository system a training data set comprising:

data tape attribute data for the data tape cartridges corresponding to historical exchanges between the data tape cartridges and media drives, wherein the data tape attribute data includes at least:
  metadata message attribute data for historical metadata messages corresponding to the historical exchanges between the data tape cartridges and the media drives; and
  quality information about the data tape cartridges; and
recommended actions for the data tape cartridges corresponding to the historical metadata messages;
applying a machine learning algorithm to the training data set to train the machine learning model to generate the recommendations;
obtaining, in real-time, from the data tape system, for a data tape cartridge, at least one metadata message based on a first set of sensed data associated with an interaction of the data tape cartridge with a first media drive;
obtaining a data tape quality value based on a second set of sensed data associated with the data tape cartridge, the second set of sensed data based on additional interactions of the data tape cartridge with one or more media drives, including the first media drive; and
applying the machine learning model to (1) first attribute data from the at least one metadata message, and (2) the data tape quality value, to generate a first action recommendation for the data tape cartridge.

15. The system of claim 14, wherein the at least one metadata message comprises a plurality of metadata messages,
  wherein the machine learning model is configured to identify a particular metadata message among the plurality of metadata messages as having a priority over each other metadata message among the plurality of metadata messages, and
  wherein the machine learning model is configured to generate the first action recommendation based on a recommendation mapped to the particular metadata message.

16. The system of claim 14, wherein generating the first action recommendation comprises:
  mapping to a second action recommendation, by the machine learning model, a data set including (1) the first attribute data from the at least one metadata message, and (2) the data tape quality value,
  wherein the at least one metadata message includes a default action recommendation,
  wherein the first action recommendation is selected, by the machine learning model, from among a set of action recommendations including the default action recommendation, and
  wherein the first action recommendation is different from the default action recommendation.

17. The system of claim 16, wherein the at least one metadata message is a metadata message indicating the data tape cartridge is at an end-of-life,
  wherein the default action recommendation is to migrate data from the data tape cartridge to another data tape cartridge, and
  wherein, based on the data tape quality value indicating the data tape cartridge is in usable condition, the first action recommendation does not include migrating the data from the data tape cartridge to another data tape cartridge.

18. The system of claim 14, wherein the operations further comprise:
  providing the first action recommendation to a graphical user interface (GUI); and
  providing to the GUI, together with the first action recommendation, a confidence score associated with the first action recommendation, the confidence score based on the data tape quality value.

* * * * *